United States Patent
Fukuda

(10) Patent No.: US 9,431,874 B2
(45) Date of Patent: Aug. 30, 2016

(54) METER UNIT INCLUDING STEP MOTOR AND BRAKING SPRING

(75) Inventor: Taisei Fukuda, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/601,215

(22) Filed: Aug. 31, 2012

(65) Prior Publication Data

US 2012/0318081 A1 Dec. 20, 2012

Related U.S. Application Data

(63) Continuation of application No. PCT/JP2011/059332, filed on Apr. 8, 2011.

(30) Foreign Application Priority Data

Apr. 9, 2010 (JP) .................................. 2010-090696

(51) Int. Cl.
| | |
|---|---|
| *H02K 7/116* | (2006.01) |
| *G01D 11/10* | (2006.01) |
| *G01D 11/28* | (2006.01) |
| *H02K 5/16* | (2006.01) |
| *H02K 7/102* | (2006.01) |

(52) U.S. Cl.
CPC ................ *H02K 7/116* (2013.01); *G01D 11/10* (2013.01); *G01D 11/28* (2013.01); *H02K 5/16* (2013.01); *H02K 7/102* (2013.01); *Y10T 74/18568* (2015.01)

(58) Field of Classification Search
CPC ........... F16D 7/025; G01P 1/026; G01P 1/08; G11B 15/54; G11B 19/28; H02K 5/165; H02K 5/163; H02K 7/102; H02K 7/116; H02K 5/161; G01D 11/10; G01D 11/24
See application file for complete search history.

(56) References Cited

U.S. PATENT DOCUMENTS 2,508,896 A * 5/1950 Smith .......................... 200/37 R
3,203,268 A * 8/1965 Manoni et al. ................... 74/411
(Continued)

FOREIGN PATENT DOCUMENTS

| CN | 101505075 A | 8/2009 |
|---|---|---|
| EP | 0726639 A2 | 8/1996 |

(Continued)

OTHER PUBLICATIONS

Machine Translation of JP 2005-253272.*
(Continued)

*Primary Examiner* — Burton Mullins
(74) *Attorney, Agent, or Firm* — Sughrue Mion, PLLC

(57) ABSTRACT

A meter unit includes a step motor, a gear, a braking spring and a case. The gear has a gear body and a rotation shaft. The braking spring urges the gear in a direction of an axis of rotation of the gear. The case accommodates the step motor, the gear body, a part of the rotation shaft, and the braking spring therein. The braking spring has a shape through which the first part of the rotation shaft passes. A first face of the gear body is formed with a recessed portion which accommodates the braking spring. A first part of the case supports a second face of the gear body. A second part of the case is configured to press the braking spring so that entire part of the braking spring is accommodated in the recessed portion.

6 Claims, 14 Drawing Sheets

(56) References Cited

U.S. PATENT DOCUMENTS

| | | | | |
|---|---|---|---|---|
| 3,530,322 A * | 9/1970 | Newell | | 310/82 |
| 3,665,348 A * | 5/1972 | Haydon et al. | | 335/68 |
| 3,815,443 A * | 6/1974 | McAninch et al. | | 475/235 |
| 4,008,646 A * | 2/1977 | Hague et al. | | 409/233 |
| 4,992,686 A * | 2/1991 | Heine et al. | | 310/49.32 |
| 5,051,855 A * | 9/1991 | Ghose et al. | | 360/264.3 |
| 5,109,308 A * | 4/1992 | Kukreja et al. | | 360/93 |
| 5,169,245 A * | 12/1992 | Harada et al. | | 384/610 |
| 5,237,469 A * | 8/1993 | Kukreja et al. | | 360/93 |
| 5,370,291 A * | 12/1994 | Kusmierz et al. | | 226/110 |
| 5,441,589 A * | 8/1995 | Groswith et al. | | 156/542 |
| 5,664,894 A * | 9/1997 | Gray et al. | | 400/134 |
| 5,665,193 A * | 9/1997 | Groswith et al. | | 156/234 |
| 5,669,257 A * | 9/1997 | Inoue et al. | | 72/20.1 |
| 5,738,449 A * | 4/1998 | Groswith et al. | | 400/234 |
| 5,945,750 A * | 8/1999 | Sauter et al. | | 310/49.23 |
| 6,107,712 A * | 8/2000 | Yamamura et al. | | 310/68 B |
| 6,149,326 A * | 11/2000 | Groswith et al. | | 400/249 |
| 6,178,860 B1 * | 1/2001 | Peters et al. | | 83/461 |
| 6,217,473 B1 * | 4/2001 | Ueda et al. | | 475/216 |
| 6,234,052 B1 * | 5/2001 | Peters et al. | | 83/76.1 |
| 6,504,276 B2 * | 1/2003 | Yamamura | | 310/75 D |
| 6,810,781 B2 * | 11/2004 | Peters et al. | | 83/581 |
| 6,944,906 B2 * | 9/2005 | Moein et al. | | 15/250.3 |
| 6,953,084 B2 * | 10/2005 | Greeb et al. | | 166/66.4 |
| 7,046,438 B2 * | 5/2006 | McWilliams | | 359/430 |
| 7,059,418 B2 * | 6/2006 | Greeb et al. | | 166/387 |
| 7,086,254 B2 * | 8/2006 | Lim et al. | | 68/23.7 |
| 7,171,718 B2 * | 2/2007 | Moein et al. | | 15/250.3 |
| 7,265,901 B2 * | 9/2007 | McWilliams | | 359/430 |
| 7,389,561 B2 * | 6/2008 | Bledsoe et al. | | 15/250.27 |
| 7,392,565 B2 * | 7/2008 | Holbrook et al. | | 15/250.27 |
| 7,402,926 B2 * | 7/2008 | Shinmura et al. | | 310/83 |
| 7,676,880 B2 * | 3/2010 | Moein et al. | | 15/250.3 |
| 9,003,910 B2 * | 4/2015 | Fukuda | | 74/409 |
| 2001/0010185 A1 * | 8/2001 | Peters et al. | | 83/581 |
| 2001/0011848 A1 * | 8/2001 | Yamamura | | 310/68 B |
| 2003/0131636 A1 * | 7/2003 | Lim et al. | | 68/23.7 |
| 2003/0213087 A1 * | 11/2003 | Moein et al. | | 15/250.3 |
| 2004/0090673 A1 * | 5/2004 | McWilliams | | 359/430 |
| 2004/0134665 A1 * | 7/2004 | Greeb et al. | | 166/379 |
| 2004/0135112 A1 * | 7/2004 | Greeb et al. | | 251/214 |
| 2006/0053577 A1 * | 3/2006 | Moein et al. | | 15/250.3 |
| 2006/0146403 A1 * | 7/2006 | McWilliams | | 359/430 |
| 2009/0071280 A1 * | 3/2009 | Nakagawa | | 74/425 |
| 2012/0234305 A1 * | 9/2012 | Jonsson | | 125/13.03 |
| 2013/0055837 A1 * | 3/2013 | Fukuda | | 74/409 |

FOREIGN PATENT DOCUMENTS

| | | |
|---|---|---|
| JP | 60065972 A | 4/1985 |
| JP | 2002-340631 A | 11/2002 |
| JP | 2005253272 A | 9/2005 |

OTHER PUBLICATIONS

PTO 14/4380 translation of JP 2005-253272 A.*
JP 2002-340631 A machine translation.*
PTO 15/1268, Translation of JP 2002-340631 A, H. Nakane, Inner Turning Device for a Meter.*
PTO 15/1268 translation of JP 2002-340631.*
International Search Report dated Feb. 22, 2012 issued by the International Searching Authority in International Application No. PCT/JP2011/059332.
Written Opinion dated Feb. 22, 2012 issued by the International Searching Authority in International Application No. PCT/JP2011/059332.
Office Action, dated Apr. 29, 2014, issued by the State Intellectual Property Office of P.R. China in counterpart Chinese Patent Application No. 201180018187.2.

* cited by examiner

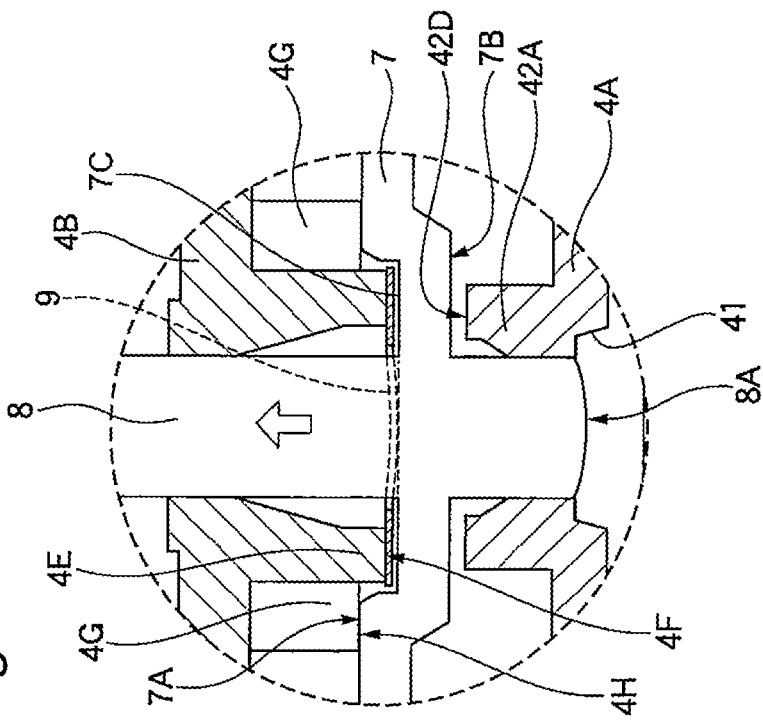
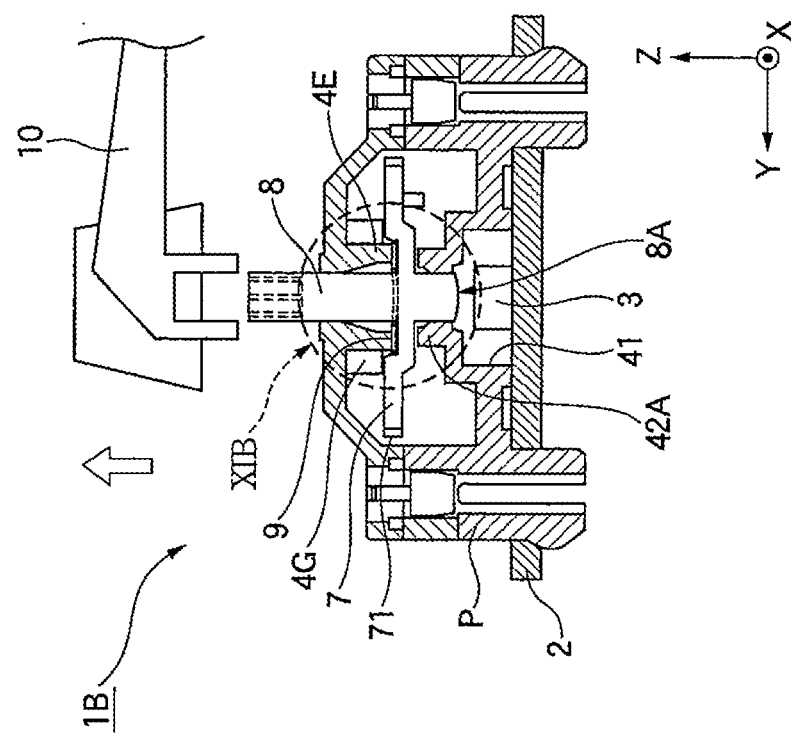
Fig. 11A
Fig. 11B

METER UNIT INCLUDING STEP MOTOR AND BRAKING SPRING

CROSS REFERENCE TO RELATED APPLICATION

This application is a continuation of PCT application No. PCT/JP2011/059332, which was filed on Apr. 8, 2011 based on Japanese Patent Application (No. 2010-090696) filed on Apr. 9, 2010, the contents of which are incorporated herein by reference. Also, all the references cited herein are incorporated as a whole.

BACKGROUND OF THE INVENTION

1. Technical Field

The present invention relates to a meter unit used in a meter device that rotatably supports a rotation shaft which a pointer is attached, in the meter devices of various uses for a meter for a motor vehicle, a meter for a ship, a meter for an aircraft or the like.

2. Background Art

In meter devices used in various kinds of meters, a motor and a gear for transmitting torque from the motor to a rotation shaft are accommodated in a case, and the rotation shaft to which the turning force or torque from the gear is transmitted to rotate is rotatably supported relative to the case. In such a meter device, in order to suppress a minute swing movement of the rotation shaft during a rotation, frequently, a resin spring is formed integrally with the gear.

However, the resin spring is liable to generate a permanent set in fatigue due to an aged change, namely a permanent deformation. Accordingly, when the resin spring is used for a long period of time, a force for pressing the rotation shaft in an axial direction is weakened to increase the minute swing movement of the rotation shaft.

Thus, a rotation shaft support structure is proposed that can avoid the increase of a minute swing movement of a rotation shaft caused by an aged permanent set in fatigue and suppress the minute swing movement of the rotation shaft (see JP-A-2005-253272).

Specifically, as shown in FIG. 13, the rotation shaft support structure includes a case 101 including an upper case 101A and a lower case 101B and fixed to a wiring board 106. A thrust leaf spring leaf spring 102 made of a flat-plate-shaped metal is mounted between a gear 103 and the case 101 so as to be freely bent in the case 101. Accordingly, a pointer not shown in the drawing or a pointer shaft 105 to which the pointer is attached can be smoothly rotated.

In the rotation shaft support structure, as shown in FIG. 14, a rotation shaft 104 extending integrally from the pointer shaft 105 is inserted into a hole 102B (see FIG. 15) of a central part of the leaf spring 102. Further, a boss 104A fixed to the rotation shaft 104 is pressed to the leaf spring 102 to bend the leaf spring 102 in a curved state. A reaction force from the leaf spring 102 at that time is used as a load to generate a braking force to the rotation shaft 104.

Further, in such a rotation shaft support structure of the meter device, in order to take in a light from a light source from a base end part of the rotation shaft, guide the light to an end through an inner part of the rotation shaft, emit the light and illuminate a pointer attached to the end of the rotation shaft, the rotation shaft is also known that is formed with a transparent material having a good light guiding property. Such a rotation shaft support structure is called "type also serving to guide lights".

SUMMARY OF THE INVENTION

In the rotation shaft support structure of the meter device having the structure as described above, the leaf spring 102 is provided in a lower part (the lower case 101B side) relative to the gear 103. In such a structure, since the boss 104A in contact with the leaf spring 102 needs to be additionally provided to provide the leaf spring 102, a relatively large installation space is necessary in the direction of thickness of the case 101. Especially, when various kinds of gears that transmit torque to the rotation shaft from a motor are not arranged in a transverse direction, but laminated together in a vertical direction, the gears are further stacked in addition to the above-described boss. Thus, the thickness of the case is further increased. Accordingly, the above-described structure is not suitable especially for a thin structure.

It is therefore one advantageous aspect of the present invention to provide a meter unit in which a stable load spring can be obtained and a smooth rotating operation of a rotation shaft can be obtained.

According to one aspect of the invention, there is provided a meter unit, comprising:
a step motor;
a gear having:
    a gear body, configured to be rotated by a torque transmitted from the step motor, and having a first face and a second face opposite to the first face; and
    a rotation shaft including a first part extended from the first face and a second part extended from the second face;
a braking spring configured to urge the gear in a direction of an axis of rotation of the gear; and
a case accommodating the step motor, the gear body, a part of the rotation shaft, and the braking spring therein, wherein
the braking spring has a shape through which the first part of the rotation shaft passes,
the first face is formed with a recessed portion which accommodates the braking spring,
a first part of the case supports the second face of the gear body, and
a second part of the case is configured to press the braking spring so that entire part of the braking spring is accommodated in the recessed portion.

The meter unit may be configured such that: the braking spring has an annular shape having a hole through which the rotation shaft passes; and the second part of the case is protruded from an inner face of the case to the braking spring and comes in contact with the braking spring at an end part thereof.

The meter unit may be configured such that: the braking spring is a leaf spring; a periphery of the leaf spring has a circular shape or an elliptical shape; and the recessed portion surrounds the rotation shaft and is recessed corresponding to the periphery of the leaf spring.

The meter unit may further comprising a stopper, protruded from the inner face of the case toward the first face of the gear body, and may be configured such that: an end face of the stopper is configured to come in contact with the first face of the gear body so as to prevent the rotation shaft from being pulled out when a pointer attached to an end part of the first part of the rotation shaft is pulled out; the end face of the stopper is provided at a distance from the end part of the second part of the case in a direction separating from the gear body; and a distance between the end face of the stopper and the end part of the second part of the case is smaller than a depth of the recessed portion.

The meter unit may be configured such that: the first part of the case is a bearing which supports the second part of the rotation shaft, and the second part of the case is a shaft hole which supports the first part of the rotation shaft.

According to the meter unit having the above structure, a stable load spring can be obtained, a smooth rotating operation of the rotation shaft can be obtained and a light guide performance is not deteriorated.

According to the meter unit having the above structure, since the spring abutting member constantly comes into contact with at least a part of the annular braking spring, even when the braking spring rotates integrally with the gear that accommodates the braking spring or the rotation shaft, the spring contacting member can be constantly pressed so as to allow the braking spring to generate a load to the gear. As a result, the rotating operation of the rotation shaft can be stabilized.

According to the meter unit having the above structure, the braking spring is easily arranged in the recessed portion of the gear.

According to the meter unit having the above structure, a situation that when the pointer is detached, namely, when the pointer is pulled out from the end of the rotation shaft, the gear and the rotation shaft to which the pointer is attached are pulled upward together to, for instance, a predetermined range or more can be avoided by the stopper member serving like a stay. Thus, the braking spring sandwiched between the case and the gear can be prevented from being pressed to the point where it loses its resilient force.

According to the meter unit having the above structure, when a bearing or a shaft hole provided in a case of a related meter unit are slightly improved, the present invention can be embodied.

According to the meter unit of the present invention, the stable load spring constantly acts on the rotation shaft, the smooth rotating operation of the rotation shaft is obtained, the light guide performance is not deteriorated and a device is preferably suitably thinned.

BRIEF DESCRIPTION OF THE DRAWINGS

FIG. 11A is a sectional view showing an operation of the meter unit according to the second embodiment of the present invention.

FIG. 11B is an enlarged view of main parts of a part XIB shown in FIG. 11A.

DETAILED DESCRIPTION OF THE EXEMPLIFIED EMBODIMENTS

Referring to the attached drawings, embodiments of the present invention will be described below in detail.

Figure 1A:
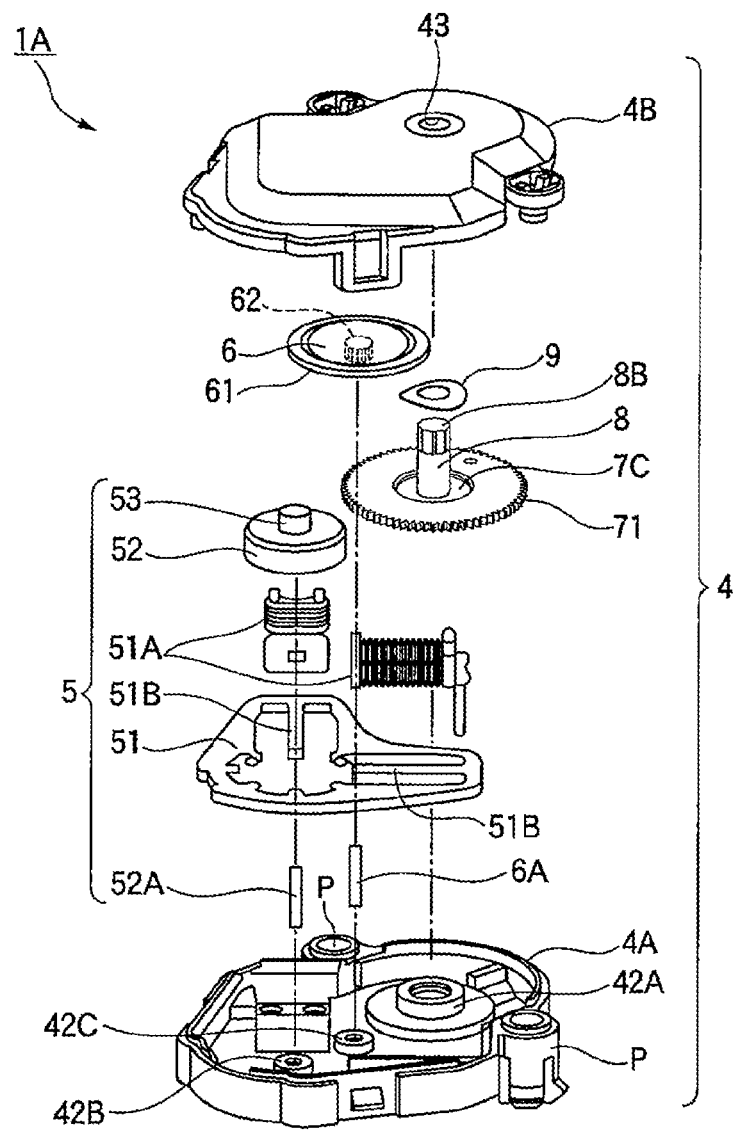
FIG. 1A is an exploded perspective view of a meter unit according to a first embodiment of the present invention.
Figure 1B:
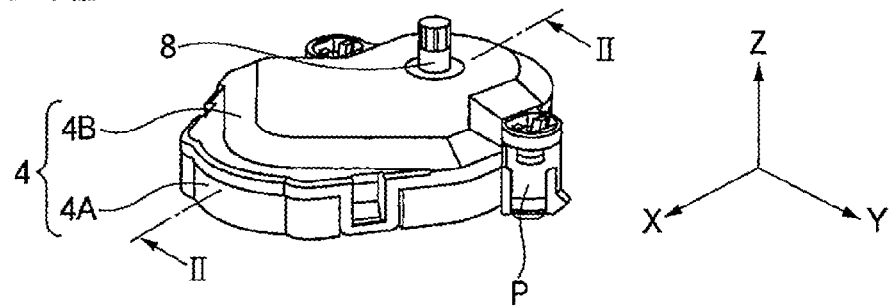
FIG. 1B is a perspective view of the meter unit shown in FIG. 1A.
Figure 2:
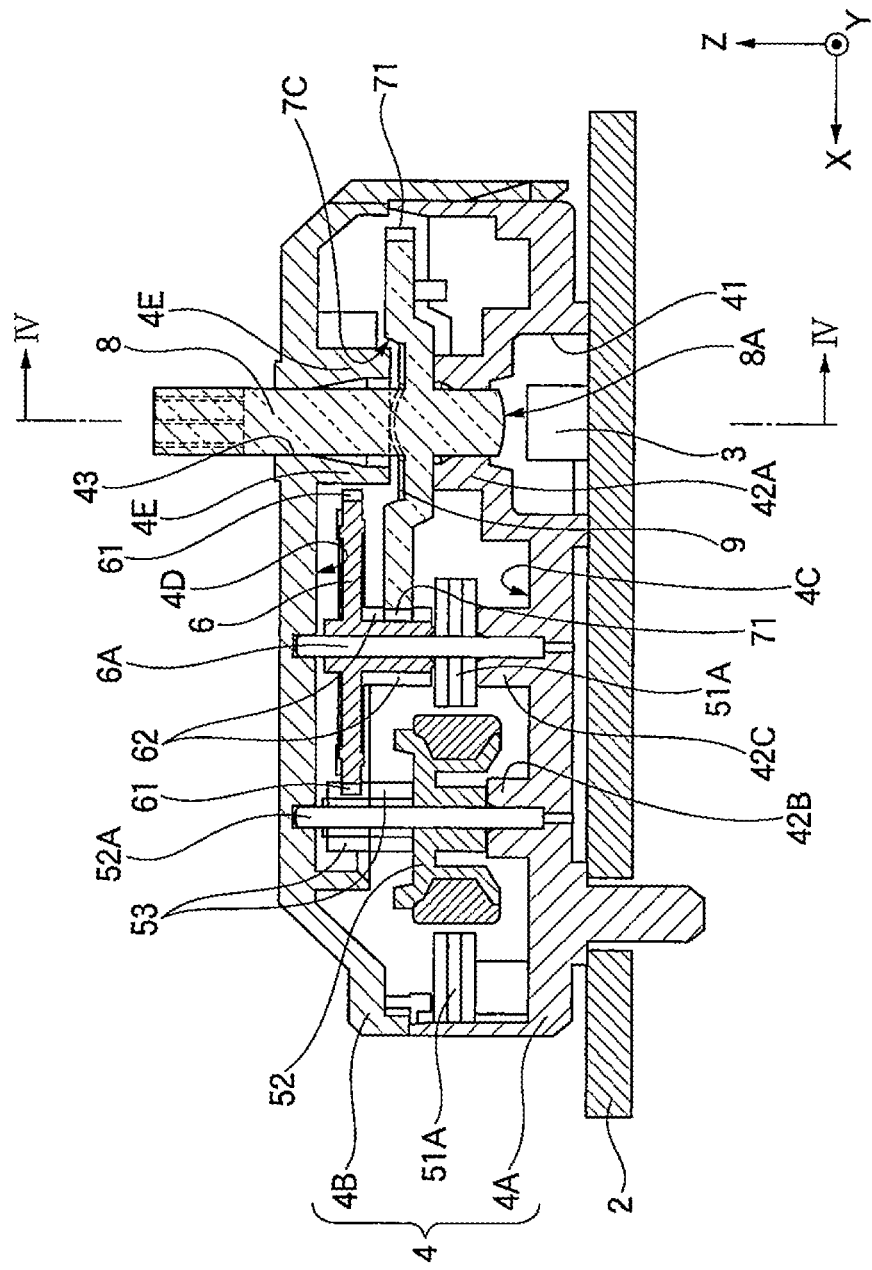
FIG. 2 is a sectional view taken along a line II-II of the meter unit shown in FIG. 1B.

FIGS. 1 and 2 show a meter unit 1A according to a first embodiment of the present invention. In the meter unit 1A, movement parts such as a step motor 5, a speed reducing gear train and a rotation shaft 8 are accommodated in a case 4. A meter device to which the meter unit 1A is attached includes a light source 3 mounted on a base board 2 shown in FIG. 2, the meter unit 1A attached to a predetermined position on the base board 2 including an area where the light source 3 is mounted and a display plate not shown in the drawing that is installed on an upper part of the meter unit 1A to display necessary information related to a vehicle itself or an environment in the periphery of the vehicle such as numeric characters, characters, signs or the like.

The meter device to which the meter unit 1A according to the present embodiment is applied forms a part of a combination meter not shown in the drawing. The display plate forming a front face side is fitted over an entire face part to form the inside plate of the cover. Further, the display plate has various kinds of windows opened for installing various kinds of meters including the meter unit 1A and is formed integrally with a combination meter case forming a side face and a rear face side. Further, the display plate has an upper part covered with a black transparent cover glass or the like which is not shown in the drawing.

The meter device to which the meter unit 1A of the present embodiment is applied forms, for instance, a speed meter. In this case, a below-described pointer is rotated by a predetermined angle in accordance with a sensor signal corresponding to a present speed detected by a sensor not shown in the drawing to indicate a specific numeric character formed on the display plate which is not shown in the drawing, so that the present speed is analog displayed.

The light source 3 of the present embodiment is formed with, for instance, an LED (Light Emitting Diode) that emits visible rays of predetermined wavelength $\lambda$ and is mounted on the base board 2 just below an end face 8A of the rotation shaft 8 under a state that the light source 3 is directly opposed to the below-described end face 8A in a lower side of the rotation shaft 8. The LED as the light source 3 of the present embodiment has an optical axis set in a direction Z vertical to the upper face of the base board 2. Most of illuminating lights from the LED are emitted toward the end face 8A in the lower side of the rotation shaft 8 just above the light source 3. The illuminating lights incident from the end face 8A in the lower side of the rotation shaft 8 are guided to an end in the upper side of the rotation shaft 8 protruding from the upper part of the motor case 4 so that the pointer pressed-in to the upper end emits lights and are lighted.

The motor case 4 includes a lower case 4A fixed to the base board 2 and an upper case 4B overlaid on the lower case 4A. In the motor case 4, are accommodated the step motor 5, an intermediate gear 6, an output gear 7 and the rotation shaft 8 (in this case, an end in the upper side is excluded) formed integrally with the output gear 7. Further, in the motor case 4, a braking spring 9 which will be described below in detail is accommodated in an attached state between the output gear 7 and the upper case 4B. Specifically, the braking spring 9 is accommodated in a recessed portion 7C provided on an upper face 7A of the output gear 7 side. The recessed portion 7C is recessed corresponding to the periphery of the braking spring 9. The end in the upper side of the rotation shaft 8 protrudes outside the motor case 4. The pointer not shown in the drawing is pressed-in and fitted to the end face 8B of the upper side.

The lower case 4A is formed substantially in a box shape with an upper part opened. Further, the lower case 4A has cylindrical protrusions P protruding downward (a direction of -Z) and provided on both right and left side faces. The cylindrical protrusions P are respectively fitted to fixing holes opened on the base board 2 which are not shown in the drawing.

Further, in the lower case 4A, a bearing 42A is formed that cylindrically protrudes upward (toward the upper case 4B) from a central part of a recessed portion 41 formed in a lower face, in other words, protrudes from a floor face 4C side toward a ceiling face 4D of the upper case 4B. Further, in an inner face of the lower case 4A which is a floor face 4C, as shown in FIGS. 1A to 2, cylindrical bearings 42B and 42C which slightly protrude toward the upper case 4B are respectively formed at their predetermined positions.

In the lower case 4A, as described above, the bearing 42A is provided that protrudes from the floor face 4C of the lower case 4A to support the end part in the lower side of the rotation shaft 8 so as to freely rotate. The bearing 42A works as a lower bearing which supports a lower face 7B opposite to an upper face 7A of the output gear 7 so as to freely rotate. As the support unit relative to the lower face 7B of the output gear 7, the bearing 42A of the floor face side of the case that supports the lower side of the rotation shaft 8 may not be used at the same time as in the present embodiment. For instance, a substantially cylindrical exclusive member for supporting a lower face opposite to the recessed portion 7C of the output gear 7 may be separately independently provided upright from the floor face 4C side.

On the other hand, in the upper case 4B, a shaft hole 43 is formed in a part just above the bearing 42A correspondingly to the bearing 42A provided concentrically with a central part of the recessed portion 41 (see FIG. 2) of the lower case 4A. The end part in the upper side of the rotation shaft 8 passes through the shaft hole 43 so as to freely rotate. Further, in the upper case 4B, bearings not shown in the drawing are respectively formed in an inner face, namely, the ceiling face 4D just above and corresponding to the bearings 42B and 42C of the lower case 4A.

Figure 3:
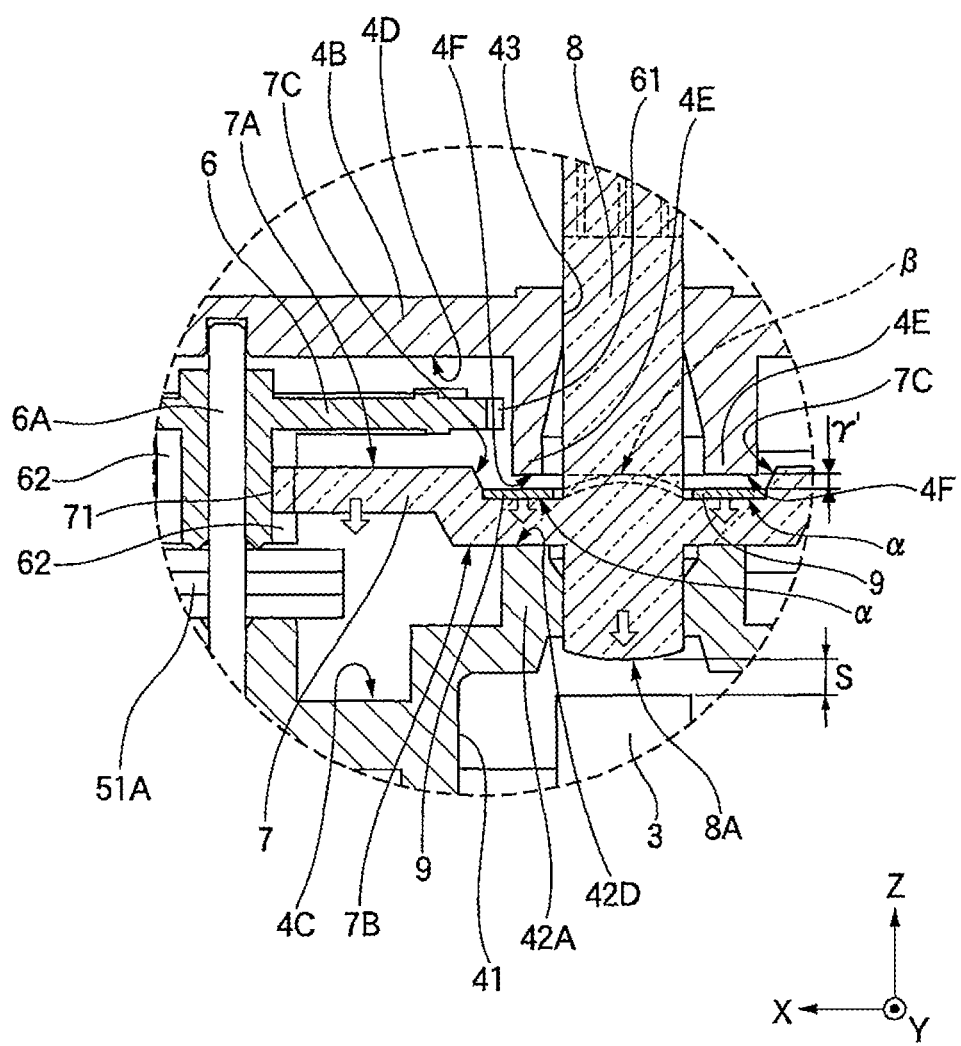
FIG. 3 is an enlarged sectional view of main parts of the meter unit shown in FIG. 2.

Further, in a part of the ceiling face 4D of the upper case 4B opposed to the recessed portion 7C of the upper face 7A side of the output gear 7, a spring contacting member 4E is integrally provided as shown in FIG. 3 with a predetermined length protruding downward from the ceiling face 4D. The spring contacting member 4E has a substantially cylindrical form with a lower end side opened. Then, when the braking spring 9 is accommodated in the recessed portion 7C of the output gear 7 and the upper case 4B is finally attached integrally to the lower case 4A, the spring contacting member 4E presses the upper face of the braking spring 9 until the braking spring 9 is accommodated in the recessed portion 7C, namely, the height of the braking spring 9 is smaller than the depth of the recessed portion 7C. Thus, the braking spring 9 is sandwiched between the spring contacting member 4E and the recessed portion 7C of the output gear 7. At this time, at least a part of an end face, which is a lower end face 4F, of the spring contacting member 4E constantly abuts on the upper face of the braking spring 9.

The step motor 5 serves to rotate the pointer not shown in the drawing and reduces a speed through the speed reducing gear train, that is, the intermediate gear 6 and the output gear 7 to rotate the rotation shaft 8. The gear train is not especially used, but a structure may be used for reducing the speed by a single gear. Then, the rotation shaft 8 is rotated to rotate the pointer formed integrally with the rotation shaft along a face of the display plate and indicate various kinds of necessary information. The step motor 5 in the present embodiment includes, as shown in FIG. 1, a stator 51 and a rotor 52 attached to a rotor shaft 52A arranged in an opened central part of the stator 51.

A rotor gear 53, the intermediate gear 6 and the output gear 7 which form the speed reducing gear train of the present embodiment are stacked and arranged in parallel in such a way as described below. The gears are partly stacked so that the adjacent gears enter in a staggered way in the direction of a rotating plane (X-Y), and the adjacent gears are stacked and arranged with a small clearance spaced between them in the direction of thickness (Z).

The stator 51 is fixed to the lower case 4A and a magnetic core 51B serving as a magnetic pole protrudes toward the opened central part of the stator 51. A coil 51A wound on a bobbin is attached to the magnetic core 51B.

The rotor 52 is formed with a suitable magnetic material substantially in a cylindrical form and arranged in the opened central part of the stator 51 so as to freely rotate. On an upper part of the rotor, the rotor gear 53 having the small number of teeth and a small diameter is concentrically fixed and a plurality of magnets not shown in the drawing are fixed to an outer peripheral face of the rotor. The rotor shaft 52A to which the rotor 52 is attached is, as shown in FIG. 2, supported between the bearing 42B provided in the lower case 4A and a bearing not shown in the drawing which is provided in the upper case 4B so as to freely rotate.

The intermediate gear 6 is fixed to a support shaft 6A and the support shaft 6A is supported between the bearing 42C provided in the lower case 4A and a bearing provided in the upper case 4B so as to freely rotate. In the intermediate gear 6, a large teeth 61 provided in an outer periphery and having the large number of teeth is engaged with the rotor 53 fixed to the upper part of the rotor 52 and having the small number of teeth so that a rotating speed from the rotor 52 is reduced and transmitted to the intermediate gear 6. On a lower face of the intermediate gear 6, a pinion 62 having the small number of teeth and a small diameter is fixed coaxially and integrally with the support shaft 6A.

Since the output gear 7 transmits torque from the pinion 62 of the intermediate gear 6 to the rotation shaft 8, the output gear 7 is provided integrally with the rotation shaft 8 in the vicinity of an intermediate part of the rotation shaft 8. The output gear 7 of the present embodiment is formed with a suitable transparent resin material integrally with the below-described rotation shaft 8.

In the output gear 7, a large number of teeth 71 is provided in an outer periphery, and having the large number of teeth is engaged with the pinion 62 provided in the lower part of the intermediate gear 6, so that the rotating speed of the intermediate gear 6 is more reduced and transmitted to the output gear 7 to rotate the output gear. The rotation shaft 8 is provided in a gear body and protrudes from an upper face and a lower face of a disk shaped gear body with the large teeth 71 provided on a side face so that a gear shaft of the gear body is made to be the same as an axis. Accordingly, the rotation shaft 8 is rotated at the same angular velocity as that of the output gear 7 whose speed is greatly reduced and can rotate the pointer with high accuracy. Further, in the gear body of the output gear 7, the recessed portion 7C that accommodates the braking spring 9 through which the rotation shaft 8 protruding from the upper face of the gear body passes is formed on the upper face so as to surround the rotation shaft 8. The recessed portion 7C is formed to be slightly larger than an external form of the braking spring 9.

The rotation shaft 8 of the embodiment is, as described below in detail, arranged so that the rotation shaft may be pressed downward by a resilient force of the braking spring 9 arranged on the upper face of the output gear so as to be movable within a range of a below-described predetermined clearance γ' (see FIG. 12B) along the axial direction (Z). The clearance γ' corresponds to a space between an upper face of the braking spring 9 and the lower end face 4F of the spring contacting member 4E in FIGS. 3 and 4. On the other hand, in order to allow the pinion 62 of the embodiment which is engaged with the large teeth 71 of the output gear 71 to meet the above-described movement, namely, to allow the pinion 62 to be engaged with the large teeth 71 of the output gear 7 within the movable range, the teeth of the pinion 62 are formed to be somewhat long along the axial direction.

In other words, the pinion 62 serves not only as a turning force transmitting unit to the large teeth 71 of the output gear 7 that can slide in the axial direction, but also as a slide unit that can move the output gear 7 and the rotation shaft 8 in the axial direction (Z) within the range of the clearance γ'.

In this connection, for realizing a slide operation, since the output gear 7 and the rotation shaft 8 are ordinarily pressed downward by the braking spring 9 so as to be stabilized at the lowest position, the output gear 7 and the rotation shaft 8 can be moved upward from this position within the range of the clearance γ'.

The rotation shaft 8 serves as a unit for rotating the pointer and serves as a light guide unit for guiding the illuminating lights from the light source 3 to the pointer at the same time. Accordingly, the rotation shaft 8 is formed integrally with the output gear 7 with a suitable light transmitting resin material excellent in its light guide property especially under a state that the axial direction is directed toward a vertical direction relative to the rotating plane of the output gear 7. The rotation shaft 8 of the present embodiment is formed substantially in a cylindrical form to guide the illuminating lights from the light source 3 to the pointer. To ensure a predetermined quantity of passing lights, the rotation shaft 8 has an outside diameter larger than that of a rotation shaft having no light guide function.

As described above, the rotation shaft 8 has the upper side that protrudes outside the motor case 4 from the shaft hole 43 of the upper case 4B and the pointer is pressed-in and attached to the upper end part protruding to the face of display plate. As described above, the rotation shaft 8 is supported by the shaft hole 43 of the upper case 4B side which functions as a bearing of an upper side and a lower side is supported by the bearing 42A provided in the lower case 4A so as to freely rotate.

Further, as described above, the rotation shaft 8 has the lower end face 8A provided just above the light source 3 and directly opposed thereto. Accordingly, when the illuminating lights from the light source 3 are incident on the end face 8A, most of the illuminating lights are repeatedly reflected in an interface part of an inner part of the rotation shaft 8 to an outer peripheral face, guided and propagated toward the upper end face 8B. The reflection in the interface part is a total reflection or a regular reflection.

Further, since the rotation shaft 8 is urged downward by the below-described braking spring 9, as shown in FIG. 3, the lower face 7B of the output gear 7 is ordinarily butted against an upper face 42D of the bearing 42A and is accommodated under a state that the lower face 7B is lowered to the lowest position of the range of the clearance γ'. Accordingly, the large teeth 71 of the output gear 7 formed integrally with the rotation shaft 8 can be engaged with the pinion 62 so as to be axially displaced relative to the pinion 62 that is formed to be somewhat long in the axial direction. A length of the pinion 62 is longer than a thickness of the large teeth in the axial direction by at least the clearance γ'.

The braking spring 9 is formed by cutting a suitable metallic thin plate having flexibility substantially in a circular or elliptical shape. As shown in FIG. 6, in a natural state obtained when an external force is not applied to the braking spring, the braking spring has a bent form wavy in the direction of thickness (Z). The braking spring 9 of the present embodiment has a symmetrical ring form having a below-described hole 91 provided at a central part to generate a resilient force of a level corresponding to the displacement of the bent part in the direction of thickness.

The hole 91 is opened to a regular circular shape at least having a dimension of an opening larger than a dimension of the outside diameter of the rotation shaft 8, through which the upper side of the rotation shaft passes.

Further, as shown in FIG. 6, in the braking spring 9, when an annular part of the spring extending along the circumferential direction facing the hole 91 is pressed downward in the direction of (−Z) from the spring contacting member 4E provided in the ceiling face 4D side in the upper case 4B toward the recessed portion 7C of the output gear 7, a resilient force directed downward in the direction (−Z) is generated in the rotation shaft 8 through the output gear 7.

The braking spring 9 of the present embodiment is accommodated in the recessed portion 7C in such a state that two areas of a substantially U shape in bottom areas α come into contact with bottom faces of the recessed portion 7C formed on the upper face 7A of the output gear 7 at two positions as shown in FIG. 3. The contacts between the bottom areas α and the bottom faces of the recessed portion 7C are linear contacts or face contacts.

Figure 4:
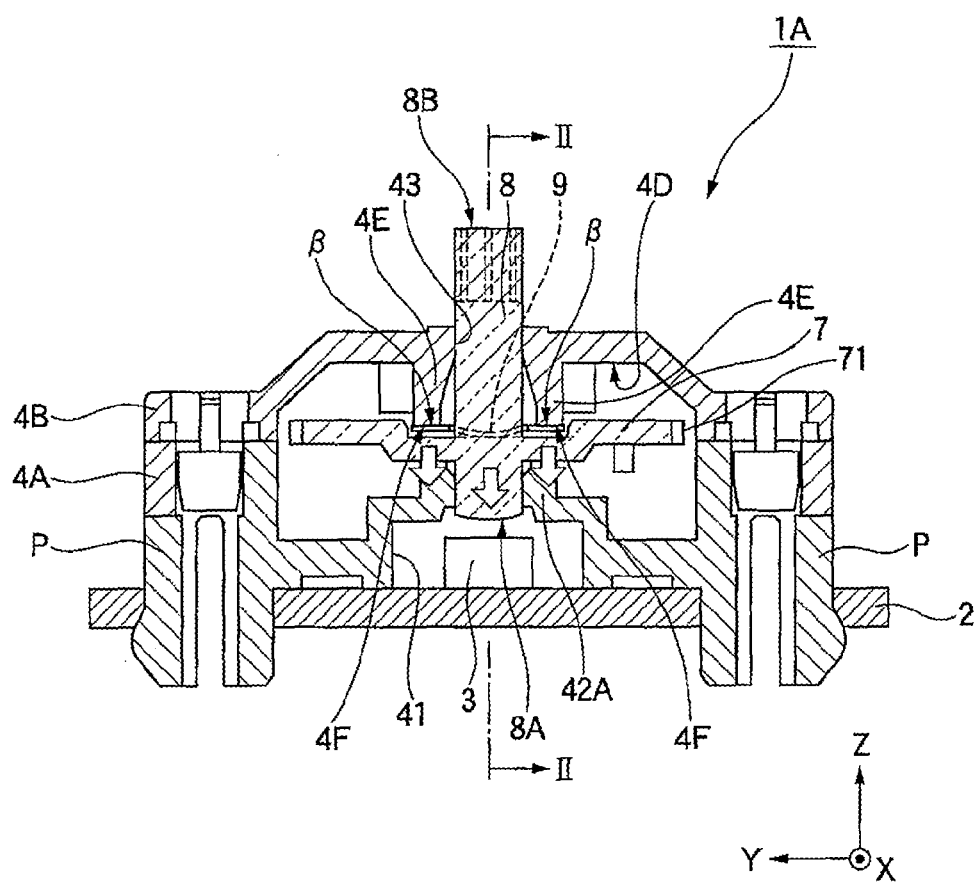
FIG. 4 is a sectional view taken along a line IV-IV in FIG. 2.
Figure 5:
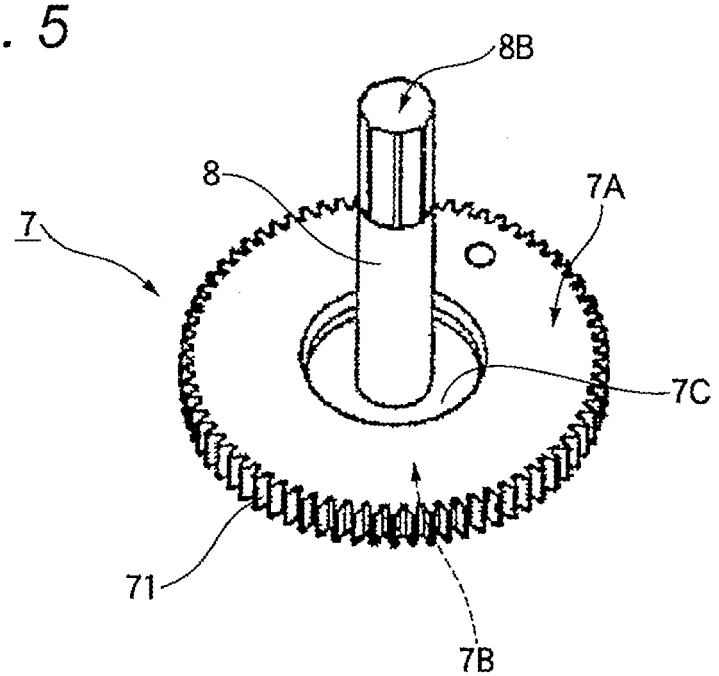
FIG. 5 is a perspective view showing an output gear and a rotation shaft of the meter unit according to the present invention.
Figure 6A:
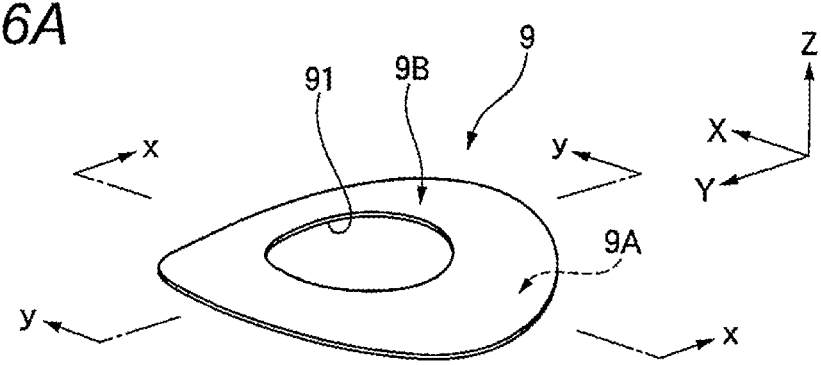
FIG. 6A is a perspective view of a braking spring of the meter unit according to the present invention.
Figure 6B:
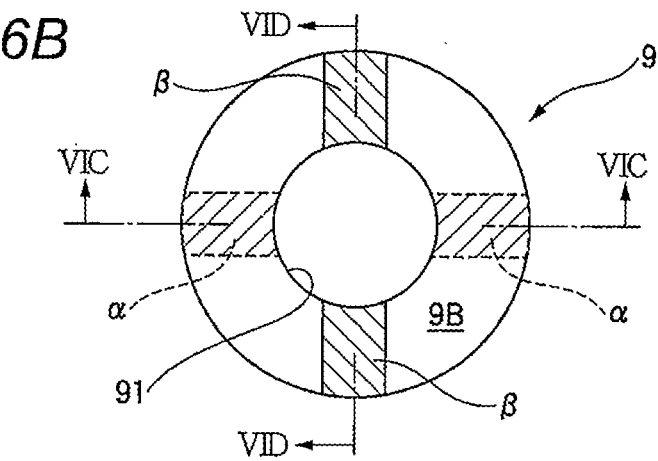
FIG. 6B is a plan view a braking spring of the meter unit according to the present invention.
Figure 6C:
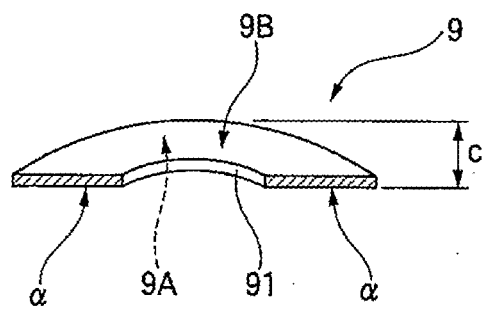
FIG. 6C is a sectional view taken along a line VIC-VIC in FIG. 6B.
Figure 6D:
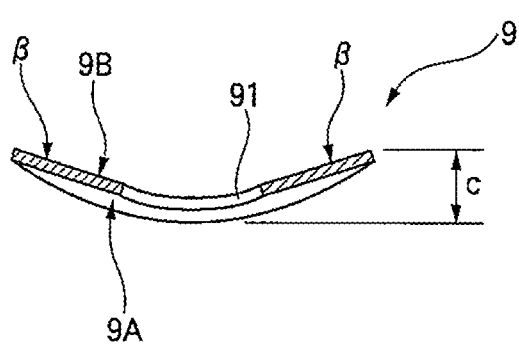
FIG. 6D is a sectional view taken along a line VID-VID in FIG. 6B.

Further, in the braking spring 9, two areas of a substantially inverted U shape in top areas β which are provided in an upper face 9B side opposed to a lower face 9A with their phase angles respectively shifted by 90° from the bottom areas α are pressed to abut on end faces of the spring contacting member 4E, as shown in FIG. 4, under a state that the two areas come into contact with the end faces of the spring contacting member 4E which is vertically extended downward from the ceiling face 4D of the upper case 4B. The contacts between the top areas β and the end faces of the spring contacting member 4E are linear contacts or face contacts. A difference in height when an external force is not applied is c (see FIGS. 6C and 6D). The braking spring 9 attached with such a difference of height urges the rotation shaft 8 by a predetermined resilient force directed to the direction of a lower end (−Z) to ensure a stable rotating operation of the rotation shaft 8.

Accordingly, when the rotation shaft 8 provided integrally with the output gear 7 and the braking spring 9 are attached between the upper and lower cases 4A and 4B, as shown in FIG. 4, the spring contacting member 4E which is vertically extended downward from the ceiling face 4D of the upper case 4B is pressed to abut on the braking spring 9 mounted on the recessed portion 7C of the output gear 7 from an upper part under a state that the lower end face 7F as the end face comes into face contact (or linear contact) with the top areas β of the braking spring 9.

Here, the braking spring 9 having the flexibility generates a resilient deformation so as to return to the bent form as the natural state. As a result, as shown in FIG. 3, a resilient force is applied to the output gear 7 in which the recessed portion 7C of the upper face 7A comes into face contact (or linear contact) with and abuts on the bottom areas α of the braking spring 9 and the rotation shaft 8 formed integrally therewith toward a lower part in the axial direction (the direction of −Z) of the rotation shaft 8. Namely, the rotation shaft 8 is constantly resiliently damped or braked by the braking spring 9.

In such a way, a minute swing movement or vibration of the rotation shaft 8 can be prevented by the braking spring 9. Further, since the rotation shaft 8 is pressed downward to the light source 3, a distance S (see FIG. 3) between the end face 8A in the lower end side of the rotation shaft 8 and the light source 3 is held to a state in which the rotation shaft 8 constantly comes close to the light source 3. As a result, since the leakage of the illuminating lights outputted from the light source 3 can be suppressed to a minimum and the illuminating lights can be taken in to the rotation shaft 8 from the end face 8A, a light guide performance is the more improved.

Figure 16:
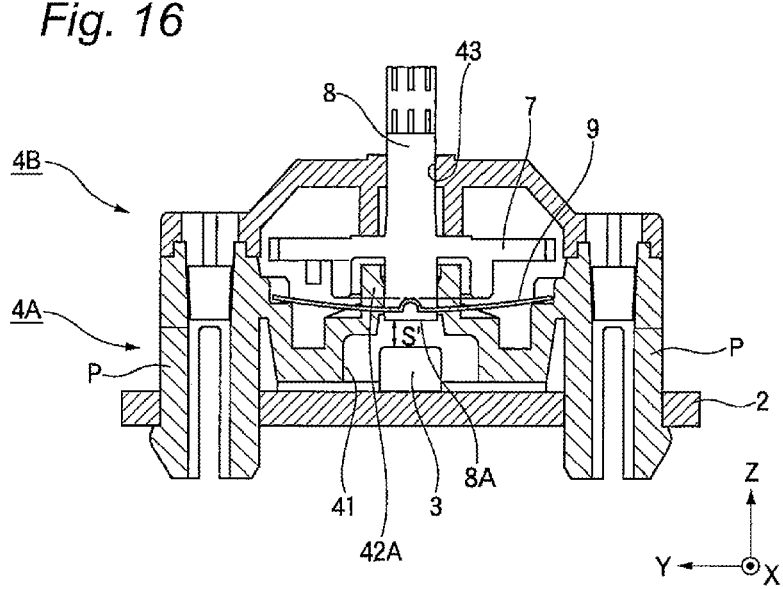
FIG. 16 is a sectional view of a meter unit which may be supposed from the related rotation shaft support structure.

In order to describe that the meter unit 1A of the above-described first embodiment of the present invention is excellent in its light guide performance, the meter unit 1A is compared with a meter unit which may be supposed from the related rotation shaft support structure. FIG. 16 is a sectional view of the meter unit which may be supposed from the related rotation shaft support structure. Since members designated by the same reference numerals as those of the meter unit 1A according to the first embodiment of the present invention are already explained, an explanation thereof will be omitted. In the meter unit which may be supposed from the above-described related rotation shaft support structure, a braking spring 9 is provided in a lower part (a lower case 4A side) relative to an output gear 7. Accordingly, the resilient force of the braking spring 9 is applied upward relative to the output gear 7. Thus, when a rotation shaft 8 is provided integrally with the output gear 7, the rotation shaft 8 is also urged toward an end in which a pointer is provided. Accordingly, in the rotation shaft also serving to guide lights at the same time as described above, an end face 8A in a lower side of the rotation shaft 8 is apt to be spaced from a light source 3 opposed thereto. In FIG. 16, the end face 8A in the lower side of the rotation shaft 8 is spaced by a distance S' from the light source 3. As a result, as the rotation shaft 8 is spaced more from the light source, lights outputted from the light source are the more leaked, so that an effective light guide performance cannot be exhibited to deteriorate light guide efficiency. On the other hand, in the meter unit 1A according to the first embodiment of the present invention, since the rotation shaft 8 is pressed downward to the light source 3, the distance S between the end face 8A in the lower end side of the rotation shaft 8 and the light source 3 is maintained to a state in which the rotation shaft 8 constantly comes close to the light source 3. As a result, the leakage of the illuminating lights outputted from the light source 3 to an external part can be suppressed to a minimum and the illuminating lights can be taken in to the rotation shaft 8 from the end face 8A. Consequently, the light guide performance is improved.

As described above, the braking spring attached under a state that the braking spring 9 is sandwiched between the spring contacting member 4E and the recessed portion 7C of the output gear 7 allows at least a part of the lower end face 4F of the spring contacting member 4E to constantly abut on the top areas β of the upper face 9B of the braking spring 9. On the other hand, to the braking spring 9, the turning force or torque from the step motor side is transmitted. During a rotation of output gear 7, the braking spring 9 rotates together with the output gear 7. However, when a frictional force between the upper face of the braking spring 9 and the lower end face 4F of the spring contacting member 4E is larger than a frictional force between the lower face of the braking spring 9 and the recessed portion 7C, the braking spring 9 is not rotated relative to the recessed portion 7C.

Accordingly, when the braking spring 9 is rotated integrally with the output gear 7, two parts of the lower end face 4F of the spring contacting member 4E in either direction of 360° constantly slide together with the top areas β of the upper face 9B of the braking spring 9. Further, since the bearing 42A which supports the output gear 7 in a lower part supports the lower face 7B of the output gear 7 from a lower side, the bearing 42A also constantly slides together with the lower face 7B of the output gear 7 during the rotation of the output gear 7.

Now, an operation of the first embodiment will be described below.

For instance, even when a minute swing movement or vibration arises in the step motor 5, or a backlash arises in the bearing part of the rotation shaft 8, the braking spring 9 having a stable spring load can effectively absorb the vibration. Accordingly, the minute swing movement or vibration of the rotation shaft 8 can be prevented.

Further, for instance, when any impact is applied to a vehicle during driving, an impact force thereof is propagated to the output gear 7 and the braking spring 9 accommodated in the recessed portion 7C of the output gear 7 from the bearing 42A forming the lower bearing of an inner face (the floor face) side of the lower case 4A to transmit the impact to the lower case 4A (similarly to the upper case 4B) of the motor case 4 through the base board 2. Then, the braking spring 9 is resiliently deformed to absorb and damp the impact force. Further, the output gear 7 slides in the axial direction within the predetermined clearance .gamma.' relative to the pinion 62 of the intermediate gear 6 formed to be somewhat long in the axial direction and engaged with the output gear 7 in accordance with the resilient displacement as required. In such a way, the impact is effectively restrained from being propagated to the rotation shaft 8 formed integrally with the output gear 7. As a result, even when the impact is applied to the vehicle body from an external part, a shaking or the minute swing movement or vibration of the rotation shaft 8 and the pointer attached to the upper part thereof can be assuredly suppressed.

Further, according to the first embodiment, since the top areas β of the braking spring 9 have substantially the inverted U shape, as shown in FIG. 4, the lower end face 4F of the spring contacting member 4E can come into linear (or face) contact with the top areas β of the braking spring 9. Consequently, a minimum contact state is obtained, in other words, the frictional force can be suppressed to a minimum. Accordingly, even when the braking spring 9 comes into contact with the spring contacting member 4E and rotates, the output gear 7 rotating together with the braking spring 9 is not prevented from rotating to have a smooth rotating operation.

Now, a meter unit 1B according to a second embodiment of the present invention will be described below by referring to FIGS. 7 to 12B. In this embodiment, the same parts as those of the first embodiment are designated by the same reference numerals to avoid a duplicated explanation.

Figure 7:
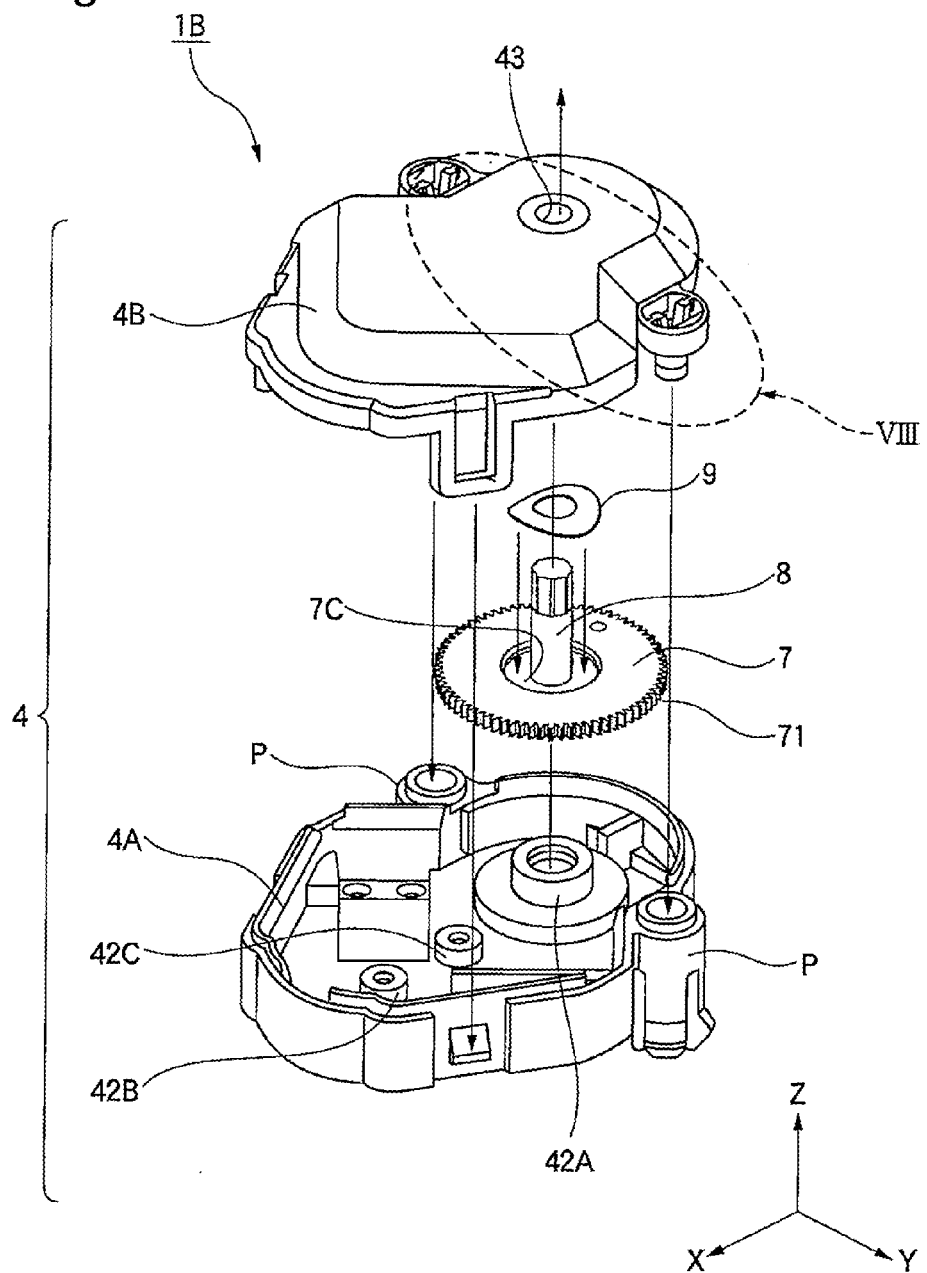
FIG. 7 is an exploded perspective view of a meter unit according to a second embodiment of the present invention.
Figure 8:
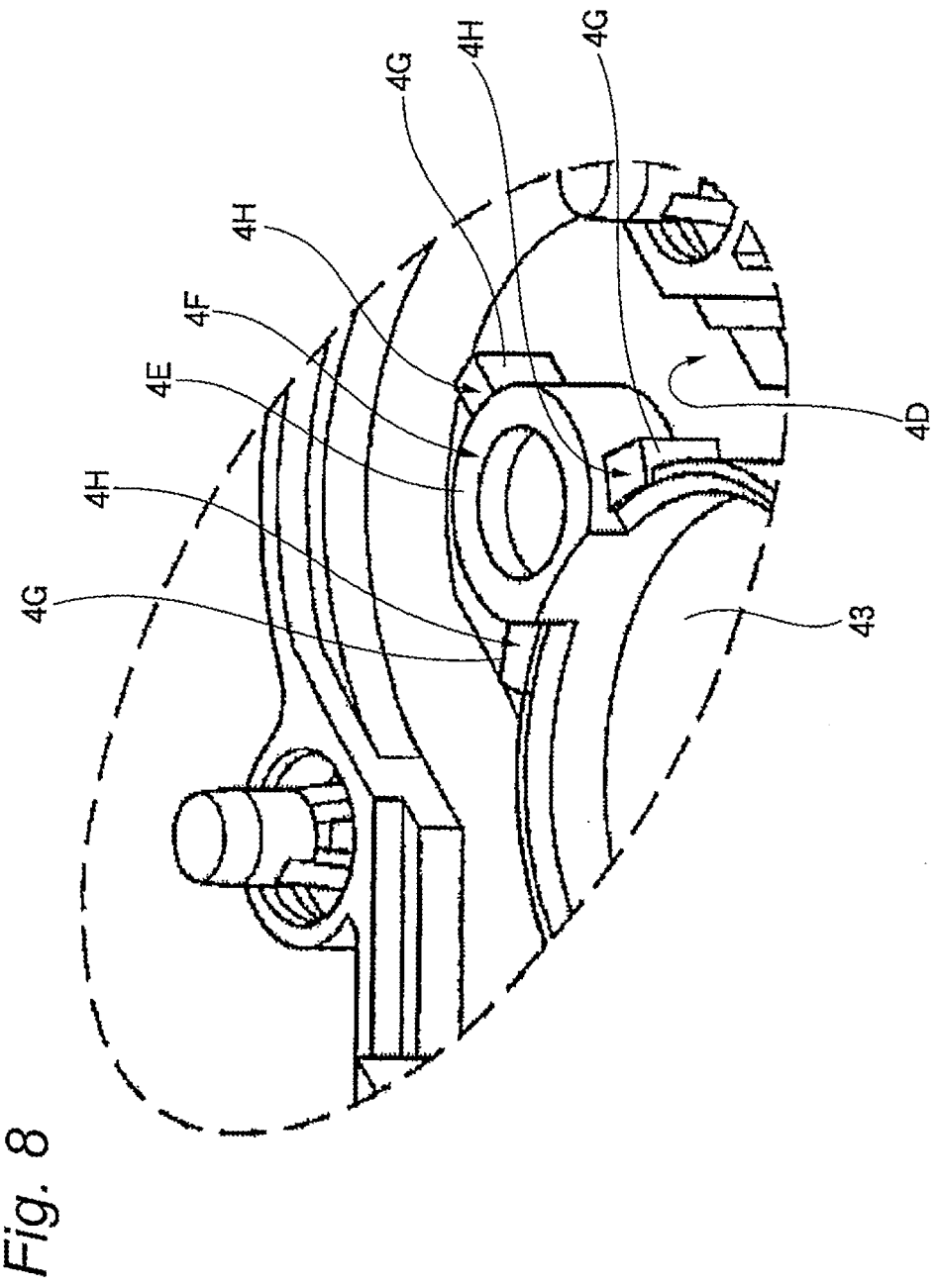
FIG. 8 is an enlarged view of main parts on a ceiling face of an upper case of the meter unit shown in a part VIII in FIG. 7.
Figure 9:
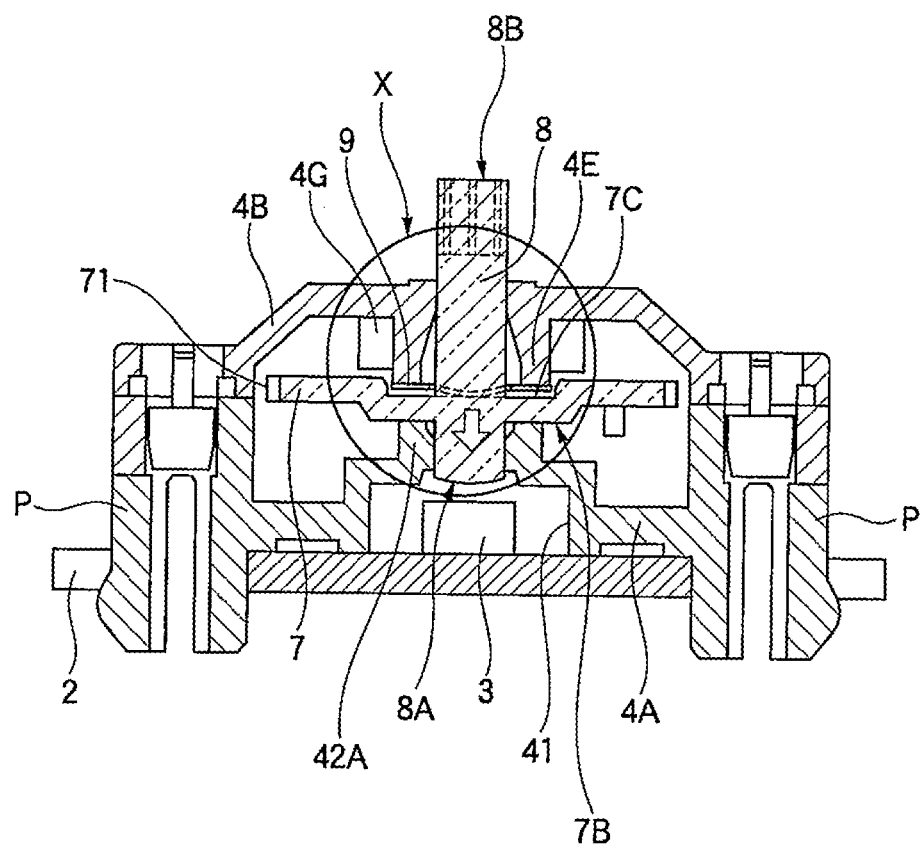
FIG. 9 is a sectional view showing the meter unit according to the second embodiment of the present invention.

The meter unit 1B of the present embodiment shown in FIGS. 7 and 9 is different from the meter unit 1A of the first embodiment in view of a point that in a ceiling face 4D of an upper case 4B, a stopper member 4G is integrally provided outside and separating from a rotation shaft 8 near a spring contacting member 4E under a state that the stopper member 4G protrudes by a predetermined length from the ceiling face 4D toward an output gear 7 as shown in FIG. 8.

The stopper member 4G serves to prevent the rotation shaft 8 formed integrally with the output gear 7 from being largely pulled upward together with a pointer when the pointer that is attached to an end of the rotation shaft 8 and is not shown in the drawing is pulled out.

According to the stopper member 4G of the present embodiment, if the rotation shaft 8 is to be pulled upward together with the pointer more than a predetermined range of a clearance γ, when the rotation shaft moves to the highest part of the range of the clearance, as shown in FIG. 11, an end face 4H of the stopper member 4G abuts on an upper face 7A of the output gear 7 to prevent the rotation shaft 8 from moving more upward. In this case, the clearance γ is smaller than the clearance γ' (see FIGS. 10, 12A and 12B).

Here, in the meter unit 1B of the present embodiment, at least between a space a between an end face 4F of the spring contacting member 4E and a bottom face of a recessed portion 7C of the output gear 7, a space b between the end face 4H of the stopper member 4G and the upper face 7A of a gear body of the output gear 7 and a maximum height c (see FIGS. 6C and 6D) under a natural state of a braking spring 9, a relation of a below-described expression is established.

$$c > a > b \quad (1)$$

These members are formed so as to have such a relation because of below-described reasons.

Namely, in order to arrange the braking spring 9 so as to exhibit a predetermined resilient force, the relation of sign of inequality of c>a is expressed by considering as a requirement the size of the space in which the spring 9 is to be arranged.

On the other hand, if the rotation shaft 8 is pulled upward together when the pointer is pulled out from the rotation shaft 8, the relation of sign of inequality of a>b is expressed by considering as a requirement a size for ensuring a predetermined amount of the space in which the braking spring 9 is sandwiched. Thus, an inconvenience can be avoided from arising that the braking spring 9 is greatly crushed to be permanently deformed so that the resilient force of the braking spring 9 is deteriorated. As a result, when the pointer is newly attached and used, since the braking spring 9 can exhibit again the predetermined resilient force, a necessary braking or damping force (a spring load) can be ensured again.

When the spring contacting member 4E and the stopper member 4G are designed so as to satisfy the expression (1), the end face of the stopper member 4G is located at a position in a direction separating from the output gear 7 spaced by a distance smaller than a depth of the recessed portion 7C from the end face of the spring contacting member 4E which comes into contact with the braking spring 9.

Figure 10:
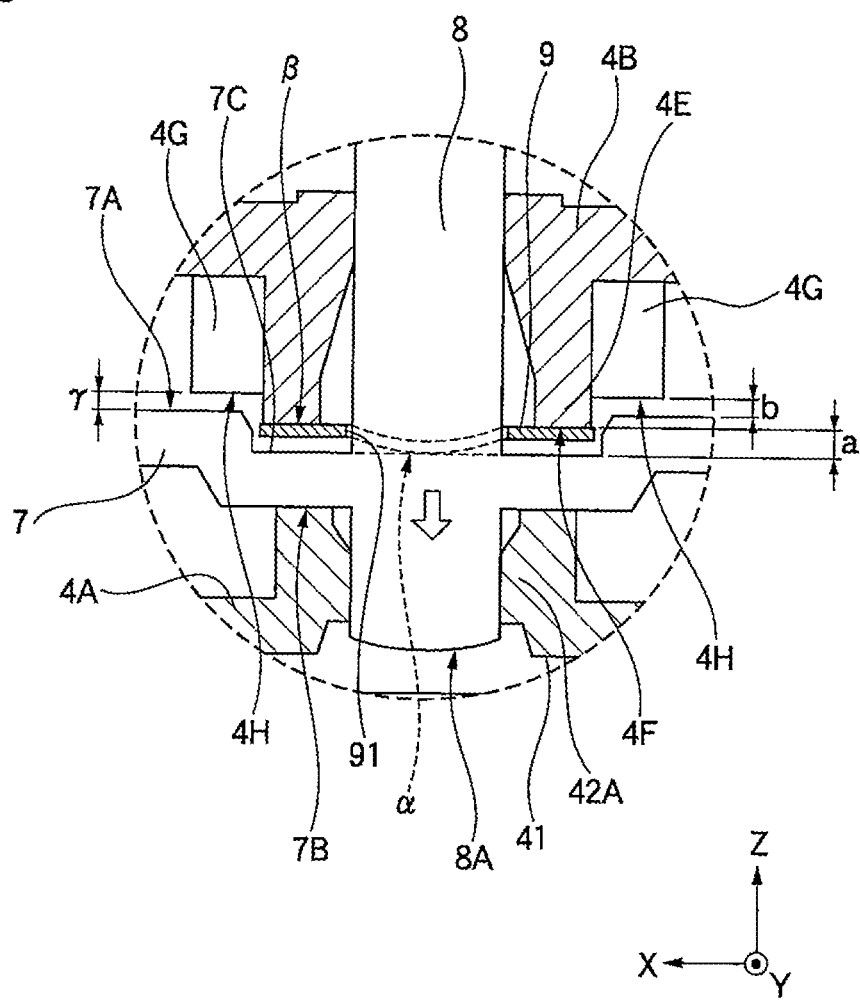
FIG. 10 is an enlarged view of a part X in FIG. 9.

In the present embodiment, as shown in FIG. 9, when a step motor, an intermediate gear 6 which are not shown in FIG. 9, the output gear 7 and the rotation shaft 8 formed integrally with the output shaft 7 are accommodated in predetermined positions in a lower case 4A, and then, the upper case 4B is fitted integrally onto the lower case 4A to complete an assembling operation, an assembly in a state shown in FIG. 10 is obtained. Namely, bottom areas α and top areas β of the braking spring 9 are vertically sandwiched under a state that the bottom areas and top areas respectively abut on the bottom face part of the recessed portion 7C provided in the output gear 7 and the lower end face 4F of the spring contacting member 4E, and the predetermined clearance γ is formed between the end face of the stopper member 4G and the gear body of the output gear 7.

In this state, since the output gear 7 is serration-engaged with a pinion 62 of the intermediate gear 6, when the braking spring 9 is resiliently deformed so as to change a vertical thickness within the range of the clearance γ, the output gear 7 can be vertically displaced along the axial direction of the slightly long pinion 62. Thus, a minute swing movement or vibration of the rotation shaft 8 can be absorbed.

Now, an operation of the present embodiment will be described by comparing with the meter unit 1A according to the first embodiment shown in FIGS. 12A and 12B.

Here, in order to easily understand the operation of the present embodiment, the operation will be described when the pointer is pulled upward in a direction of (Z) to pull out the pointer from an end of the rotation shaft 8.

Figure 12A:
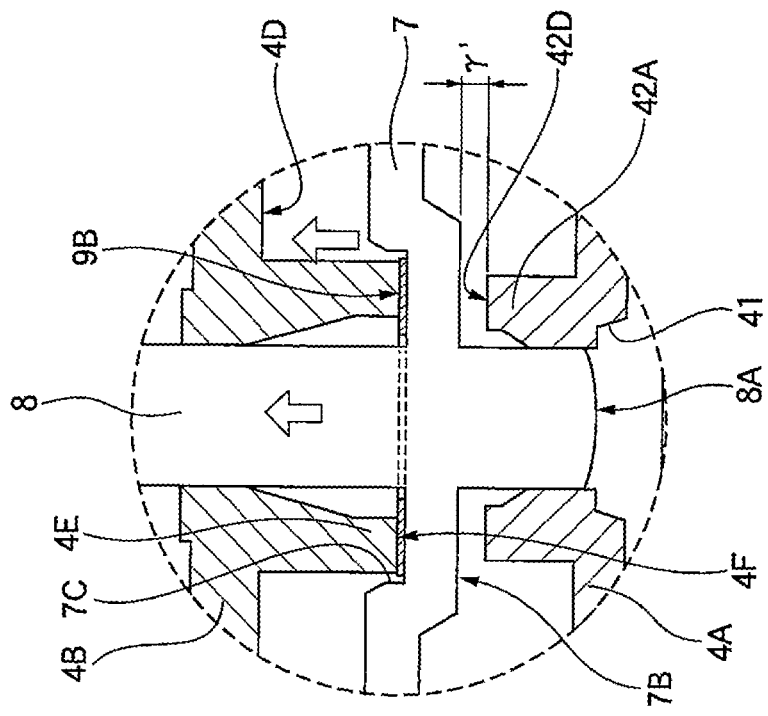
FIG. 12A is a sectional view of a comparative example for clearly showing the operation of the meter unit according to the second embodiment.

In the case of first embodiment, as shown in FIG. 12A, when the pointer is pulled upward in the direction of (Z) to pull out the pointer from an end of the rotation shaft 8, the rotation shaft 8 to which the pointer 10 is pressed in may be occasionally pulled upward at the same time. In this case, as shown in FIG. 12B, the upper face 42D of the bearing 42A in the floor face 4C side of the lower case 4A is separated from the lower face 7B part just below the recessed portion 7C of the output gear 7.

Further, the large teeth 71 of the output gear 7 are engaged with the pinion 62 and the output gear 7 is lifted within the above-described range of the clearance γ'. Namely, as shown in FIG. 12A, when the pointer 10 is pulled out from the rotation shaft 8, the output gear formed integrally with the rotation shaft 8 is also pulled thereby and is liable to be largely moved upward. Thus, as shown in FIG. 12B, the braking spring 9 is collapsed to a flat state by the spring contacting member 4E and the recessed portion 7C. Then, when the braking spring 9 is brought into the flat state, the lifting operation of the rotation shaft 8 and the output gear 7 is stopped to prevent a more lifting operation.

At this time, the braking spring 9 is strongly sandwiched between the bottom face of the recessed portion 7C and the lower end face 4F of the spring contacting member 4E. Accordingly, since a stress of a resilient limit or higher acts on the braking spring 9 to collapse the braking spring 9, the braking spring 9 is frequently plastically deformed. Thus, the predetermined resilient force cannot be maintained and a resilient property is changed. In an extreme case, the resilient force is lost.

Accordingly, when the meter unit is used by driving again the pointer to the rotation shaft 8 without changing the braking spring 9, an inconvenience arises that a necessary braking or damping force cannot be obtained by the braking spring 9 and an unevenness occurs in the rotating operation of the pointer.

On the other hand, in the meter unit 1B of the second embodiment having the stopper member 4G, when the rotation shaft 8 formed integrally with the output gear 7 is moved to the highest position of the clearance γ, as shown in FIGS. 11A and 11B, the upper face 7A of the output gear 7 on which an area of the recessed portion 7C is excluded butts against the end face 4H of the stopper member 4G. In this case, the clearance γ is smaller than the clearance γ'. Thus, the rotation shaft 8 is prevented from being lifted more.

Figure 12B:
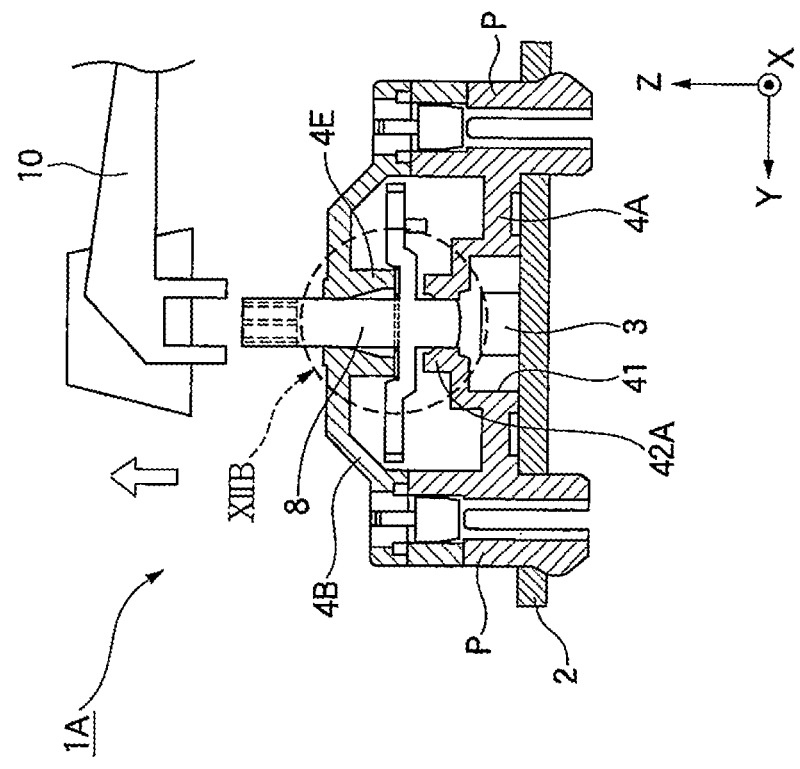
FIG. 12B is an enlarged view of main parts in a part XIIB in FIG. 12A.
Figure 13:
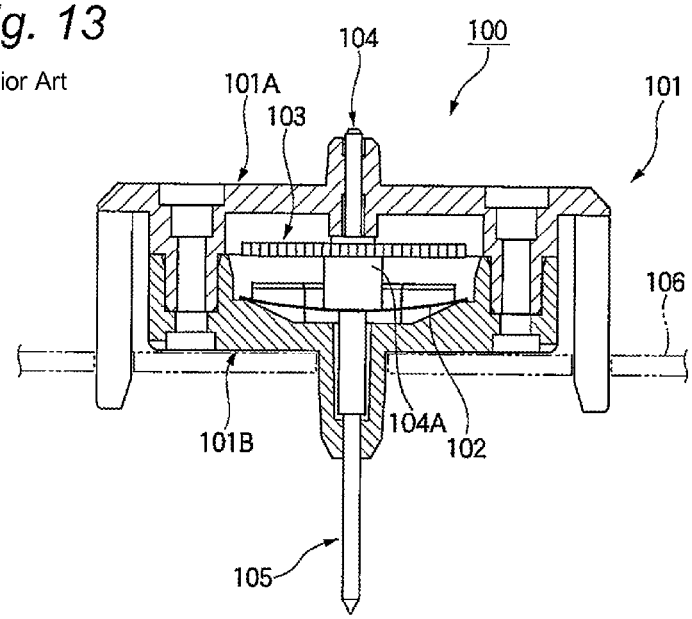
FIG. 13 is a sectional view showing a prior art rotation shaft support structure.
Figure 14:
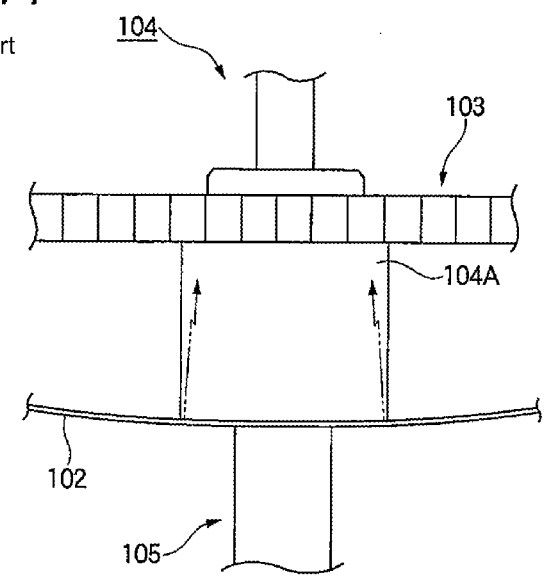
FIG. 14 is an explanatory view showing an operation of a leaf spring used in the prior art rotation shaft support structure.
Figure 15:
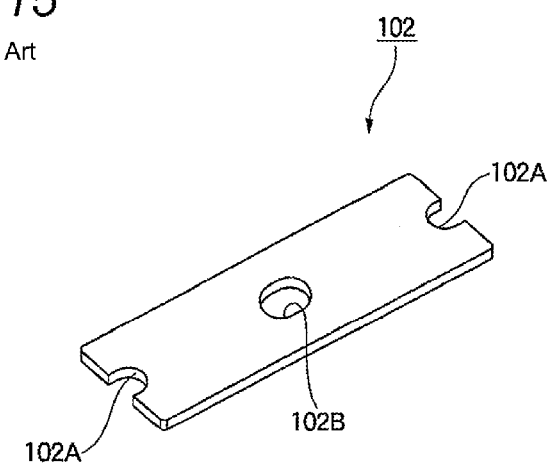
FIG. 15 is a perspective view showing the form of the prior art leaf spring.

Thus, even when a pressing force is applied to the braking spring 9 to bring the braking spring to a state near a flat state as shown in FIGS. 11A and 11B, the braking spring 9 is not pressed until the braking spring 9 is brought to a completely flat state as shown in FIGS. 12A and 12B. Accordingly, the plastic deformation of the braking spring 9 can be avoided.

The present invention is not limited to the above-described embodiments, and various kinds of forms may be embodied within a range without departing from a gist thereof.

For instance, as the support unit for supporting the gear from a lower part, the bearing 42A of the floor face 4C side of the lower case 4A that supports the lower side of the rotation shaft 8 may not be used at the same time. Namely, a member for supporting the lower face 7B corresponding to the recessed portion 7C of the output gear 7 may be separately provided upright from the floor face in place of the bearing.

Further, in both the embodiments, the braking spring 9 is formed with the metallic thin plate, however, the present invention is not limited thereto.

Further, the meter unit of the present invention may be applied to meter devices including various kinds of meters such as a fuel gauge part, a tachometer part, a speed meter part and a water temperature gauge.

The present invention is extremely useful to make a load spring of the meter unit stable, and to make a rotating operation of the rotation shaft of the meter unit smooth, without deteriorating a light guide performance.

What is claimed is:

1. A meter unit, comprising:
    a step motor;
    a gear having:
        a gear body, configured to be rotated by a torque transmitted from the step motor, and having a first face and a second face opposite to the first face; and
        a rotation shaft including a first part extended from the first face and a second part extended from the second face;
    a braking spring configured to urge the gear in a direction of an axis of rotation of the gear; and
    a case accommodating the step motor, the gear body, a part of the rotation shaft, and the braking spring therein, wherein
    the braking spring has a shape through which the first part of the rotation shaft passes,
    the first face is formed with a recessed portion which accommodates the braking spring,
    a first part of the case supports the second face of the gear body, and a second part of the case is configured to press the braking spring so that a height of the braking spring is smaller than a depth of the recessed portion,
    the braking spring has an annular shape having a hole through which the rotation shaft passes,
    the second part of the case protrudes from an inner face of the case to the braking spring and comes in contact with the braking spring at an end part thereof, and
    a portion of the second part of the case protrudes into the recessed portion of the first face of the gear body,
    wherein a portion of the second part of the case and the braking sprit are recessed in the recessed portion.

2. The meter unit according to claim 1, wherein
the braking spring is a leaf spring,
a periphery of the leaf spring has a circular shape, and
the recessed portion surrounds the rotation shaft and is recessed corresponding to the periphery of the leaf spring.

3. The meter unit according to claim 1, further comprising:
a stopper, protruding from the inner face of the case toward the first face of the gear body, wherein
an end face of the stopper is configured to come in contact with the first face of the gear body so as to prevent the rotation shaft from being pulled out when a pointer attached to an end part of the first part of the rotation shaft is pulled out,
the end face of the stopper is provided at a distance from the end part of the second part of the case in a direction separating from the gear body, and
a distance between the end face of the stopper and the end part of the second part of the case is smaller than a distance between the second part of the case and a bottom face of the recessed portion.

4. The meter unit according to claim 1, wherein
the first part of the case is a bearing which supports the second part of the rotation shaft, and
the second part of the case is a shaft hole which supports the first part of the rotation shaft.

5. The meter unit according to claim 1, wherein
the protruded part of the second part of the case has a cylindrical form with an opening formed at a side of the gear.

6. The meter unit according to claim 1, wherein a portion of the second part of the case is recessed in the recessed portion at a distance from a surface of the recessed portion, with the braking spring disposed between the surface of the recessed portion and the second part of the case.

* * * * *